US007978865B2

(12) United States Patent
Sunaga et al.

(10) Patent No.: US 7,978,865 B2
(45) Date of Patent: Jul. 12, 2011

(54) AUDIO PROCESSING APPARATUS

(75) Inventors: Tadaharu Sunaga, Neyagawa (JP); Norio Etoh, Neyagawa (JP); Yataro Yajima, Neyagawa (JP); Shintaro Jo, Neyagawa (JP); Ayako Nakatani, Neyagawa (JP); Yohei Koike, Neyagawa (JP)

(73) Assignee: Onkyo Corporation, Neyagawa-shi (JP)

( * ) Notice: Subject to any disclaimer, the term of this patent is extended or adjusted under 35 U.S.C. 154(b) by 57 days.

(21) Appl. No.: 12/564,196

(22) Filed: Sep. 22, 2009

(65) Prior Publication Data

US 2010/0195848 A1 Aug. 5, 2010

(30) Foreign Application Priority Data

Feb. 3, 2009 (JP) ................................ 2009-023103

(51) Int. Cl.
*H02B 1/00* (2006.01)
*H04R 5/00* (2006.01)
*H04R 5/02* (2006.01)

(52) U.S. Cl. .......... 381/123; 381/27; 381/307; 381/120; 381/80; 381/81

(58) Field of Classification Search ................ 381/1, 17, 381/18, 19, 22, 23, 27, 307, 56, 58, 80, 81, 381/119, 120, 123; 700/94
See application file for complete search history.

(56) References Cited

U.S. PATENT DOCUMENTS 4,953,213 A * 8/1990 Tasaki et al. .................. 381/307
6,167,140 A 12/2000 Watanabe
6,681,018 B1 * 1/2004 Asakura et al. ................ 381/18
7,006,645 B2 * 2/2006 Fujita et al. .................. 381/307
7,146,018 B2 * 12/2006 Tamayama .................... 381/300
7,813,824 B2 * 10/2010 Takahama ...................... 700/94
(Continued)

FOREIGN PATENT DOCUMENTS

EP 0866638 9/1998
(Continued)

OTHER PUBLICATIONS

European Search Report for corresponding European Application No. 10 151 516.1 dated Mar. 25, 2011.

(Continued)

*Primary Examiner* — Xu Mei
(74) *Attorney, Agent, or Firm* — Renner, Otto, Boisselle & Sklar, LLP

(57) ABSTRACT

An audio processing apparatus comprising: channel determination section for determining which one of a combination of the first left audio signal and the first right audio signal and a combination of the second left audio signal and the second right audio signal is included in multichannel audio data; and switching section for causing the first amplification section to amplify the first left audio signal and supply the amplified first left audio signal to the first speaker terminal and causing the second amplification section to amplify the first right audio signal and supply the amplified first right audio signal to the second speaker terminal when the combination of the first left audio signal and the first right audio signal is determined to be included; and causing the first amplification section to amplify the second left audio signal and supply the amplified second left audio signal to the third speaker terminal and causing the second amplification section to amplify the second right audio signal and supply the amplified second right audio signal to the fourth speaker terminal when the combination of the second left audio signal and the second right audio signal is determined to be included.

6 Claims, 9 Drawing Sheets

U.S. PATENT DOCUMENTS

| | | | | |
|---|---|---|---|---|
| 2002/0006081 | A1 | 1/2002 | Fujishita | |
| 2004/0062402 | A1 * | 4/2004 | Fujita et al. | 381/18 |
| 2007/0127925 | A1 | 6/2007 | Hayashibara | |
| 2008/0273710 | A1 * | 11/2008 | Nakabayashi | 381/81 |
| 2009/0016539 | A1 | 1/2009 | Watanabe | |

FOREIGN PATENT DOCUMENTS

| | | |
|---|---|---|
| JP | 03-080639 | 4/1991 |
| JP | 07-162384 | 6/1995 |
| JP | 2006-237928 | 9/2006 |
| JP | 2006-279537 | 10/2006 |
| JP | 2007-150406 | 6/2007 |
| JP | 2007-151173 | 6/2007 |
| JP | 2007-158561 | 6/2007 |

OTHER PUBLICATIONS

Eidson et al., "30.2: HDMI: High-Definition Multimedia Interface", 2003 SID International Symposium—May 20, 2003, Baltimore, Maryland, vol. XXXIV, p. 1024, XP007008293.

* cited by examiner

AUDIO PROCESSING APPARATUS

BACKGROUND OF THE INVENTION

1. Field of the Invention

The present invention relates to an audio processing apparatus that plays back multichannel audio data including an upper left audio signal, an upper right audio signal, an outer left audio signal, and an outer right audio signal.

2. Description of the Related Art

An audio playback system including a BD player, an AV amplifier, and a display apparatus has been used. Audio data transmitted from the BD player to the AV amplifier is obtained by encoding multichannel audio data. For example, the multichannel audio data includes, as shown in FIG. 3, a left audio signal L, a right audio signal R, a center audio signal C, a low-frequency audio signal SW, a surround left audio signal SL, a surround right audio signal SR, a surround back left audio signal SBL, and a surround back right audio signal SBR. Recently, HD (High Definition) related audio formats such as Dolby True HD, Dolby Digital Plus, and DTS-HD have appeared. In these formats, an upper left audio signal LH, an upper right audio signal RH, an outer left audio signal LW, and an outer right audio signal RW are further added.

However, when amplifiers associated with audio signals of all these channels are provided to the AV amplifier, amplifiers for 11.1 channels in total are to be provided, resulting in very high cost.

SUMMARY OF THE INVENTION

An object of the present invention is therefore to provide an audio processing apparatus capable of amplifying audio signals, such as an upper left audio signal LH, an upper right audio signal RH, an outer left audio signal LW, and an outer right audio signal RW, and outputting the amplified audio signals from speaker terminals associated with these channels, without the need to provide amplifiers of the same number as all channels.

According to a preferred embodiment of the present invention, an audio processing apparatus comprising: first amplification section for amplifying an outer left audio signal or an upper left audio signal; second amplification section for amplifying an outer right audio signal or an upper right audio signal; a first speaker terminal that outputs the outer left audio signal; a second speaker terminal that outputs the outer right audio signal; a third speaker terminal that outputs the upper left audio signal; a fourth speaker terminal that outputs the upper right audio signal; channel determination section for determining which one of a combination of the outer left audio signal and the outer right audio signal and a combination of the upper left audio signal and the upper right audio signal is included in multichannel audio data; and switching section for causing the first amplification section to amplify the outer left audio signal and supply the amplified outer left audio signal to the first speaker terminal and causing the second amplification section to amplify the outer right audio signal and supply the amplified outer right audio signal to the second speaker terminal when the combination of the outer left audio signal and the outer right audio signal is determined to be included; and causing the first amplification section to amplify the upper left audio signal and supply the amplified upper left audio signal to the third speaker terminal and causing the second amplification section to amplify the upper right audio signal and supply the amplified upper right audio signal to the fourth speaker terminal when the combination of the upper left audio signal and the upper right audio signal is determined to be included.

A determination as to which channel combination is included in multichannel audio data is made and the included channel combination is amplified by the first amplification section and the second amplification section. By this, only by providing two amplification section, a combination of an outer left audio signal and an outer right audio signal or a combination of an upper left audio signal and an upper right audio signal can be amplified and the amplified audio signals can be outputted to speaker terminals associated with channels of the audio signals.

Preferably, the audio processing apparatus further comprising: a fifth speaker terminal that outputs a surround back left audio signal; and a sixth speaker terminal that outputs a surround back right audio signal, wherein the channel determination section determines which one of a combination of the outer left audio signal and the outer right audio signal, a combination of the upper left audio signal and the upper right audio signal, and a combination of the surround back left audio signal and the surround back right audio signal is included in multichannel audio data, and when the combination of the outer left audio signal and the outer right audio signal is determined to be included, the switching section causes the first amplification section to amplify the outer left audio signal and supply the amplified outer left audio signal to the first speaker terminal and causes the second amplification section to amplify the outer right audio signal and supply the amplified outer right audio signal to the second speaker terminal; when the combination of the upper left audio signal and the upper right audio signal is determined to be included, the switching section causes the first amplification section to amplify the upper left audio signal and supply the amplified upper left audio signal to the third speaker terminal and causes the second amplification section to amplify the upper right audio signal and supply the amplified upper right audio signal to the fourth speaker terminal; and when the combination of the surround back left audio signal and the surround back right audio signal is determined to be included, the switching section causes the first amplification section to amplify the surround back left audio signal and supply the amplified surround back left audio signal to the fifth speaker terminal and causes the second amplification section to amplify the surround back right audio signal and supply the amplified surround back right audio signal to the sixth speaker terminal.

A determination as to which channel combination is included in multichannel audio data is made and the included channel combination is amplified by the first amplification section and the second amplification section. By this, only by providing two amplification section, a combination of an outer left audio signal and an outer right audio signal, a combination of an upper left audio signal and an upper right audio signal, or a combination of a surround back left audio signal and a surround back right audio signal can be amplified and the amplified audio signals can be outputted to speaker terminals associated with channels of the audio signals.

According to another preferred embodiment of the present invention, an audio processing apparatus comprising: first amplification section for amplifying a first left audio signal or a second left audio signal; second amplification section for amplifying a first right audio signal or a second right audio signal; a first speaker terminal that outputs the first left audio signal; a second speaker terminal that outputs the first right audio signal; a third speaker terminal that outputs the second left audio signal; a fourth speaker terminal that outputs the second right audio signal; channel determination section for determining which one of a combination of the first left audio signal and the first right audio signal and a combination of the second left audio signal and the second right audio signal is included in multichannel audio data; and switching section for causing the first amplification section to amplify the first left audio signal and supply the amplified first left audio signal to the first speaker terminal and causing the second amplification section to amplify the first right audio signal and supply the amplified first right audio signal to the second speaker terminal when the combination of the first left audio signal and the first right audio signal is determined to be included; and causing the first amplification section to amplify the second left audio signal and supply the amplified second left audio signal to the third speaker terminal and causing the second amplification section to amplify the second right audio signal and supply the amplified second right audio signal to the fourth speaker terminal when the combination of the second left audio signal and the second right audio signal is determined to be included.

DETAILED DESCRIPTION OF THE PREFERRED EMBODIMENTS

Audio playback systems including a disc playback apparatus (hereinafter, referred to as the BD player), an audio processing apparatus (hereinafter, referred to as the AV amplifier), and a display apparatus, according to preferred embodiments of the present invention will be specifically described below with reference to the drawings but the present invention is not limited thereto.

Figure 1:
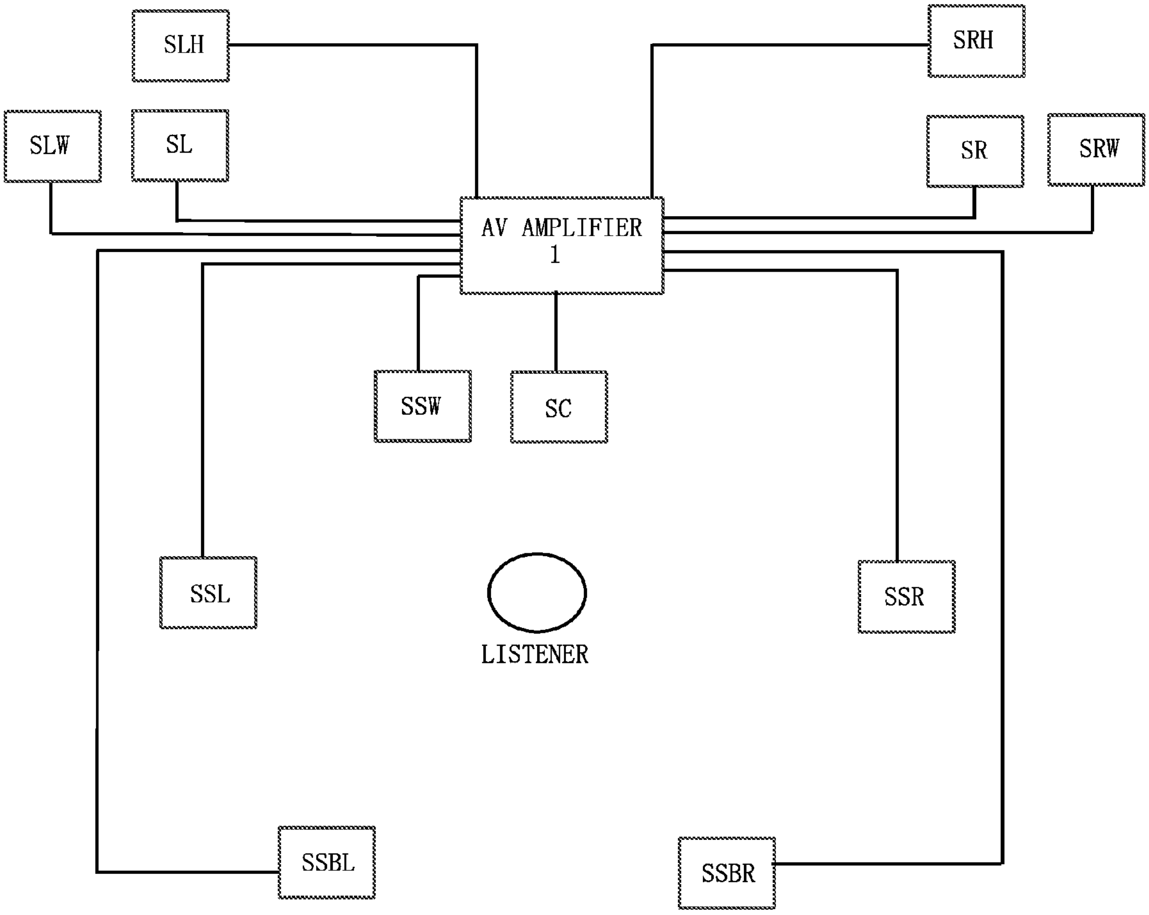
FIG. 1 is a diagram showing an arrangement of an AV amplifier 1 and speakers.

FIG. 1 is a diagram showing an example of an arrangement of an AV amplifier 1 and speakers. To the AV amplifier 1 are connected a left speaker SL, a right speaker SR, a center speaker SC, a low-frequency speaker SSW, a surround left speaker SSL, a surround right speaker SSR, a surround back left speaker SSBL, a surround back right speaker SSBR, an upper left speaker SLH, an upper right speaker SRH, an outer left speaker SLW, and an outer right speaker SRW.

Figure 2:
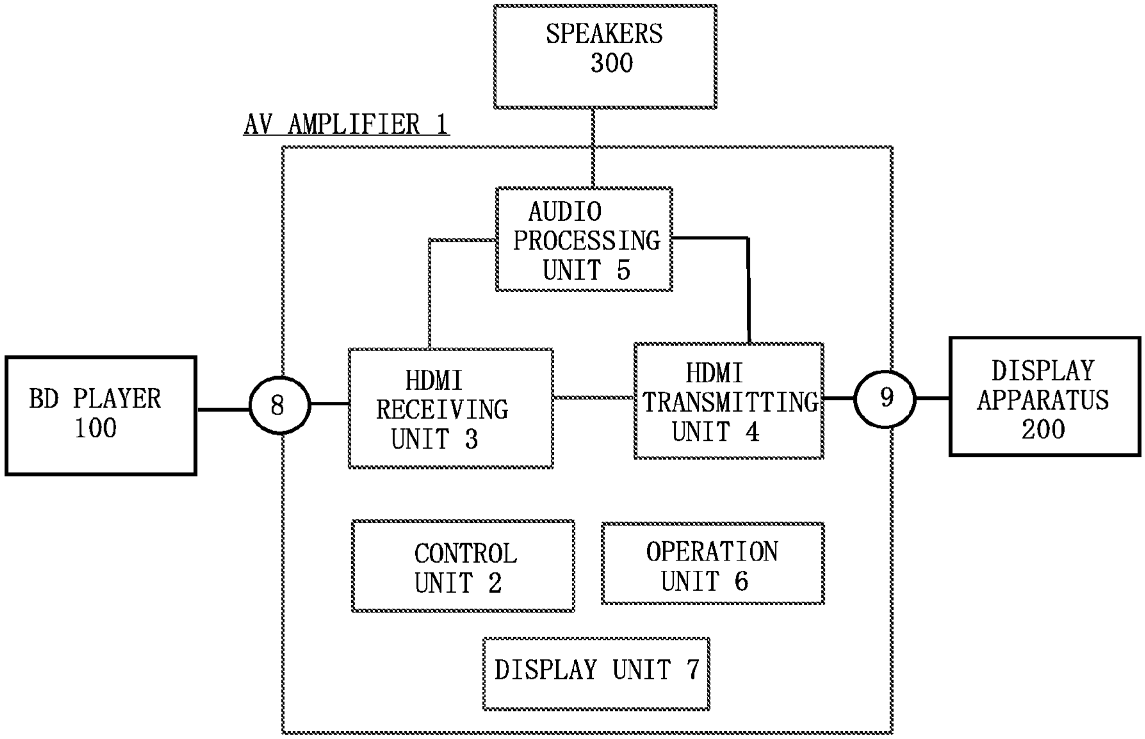
FIG. 2 is a diagram showing an audio playback system.

FIG. 2 is a block diagram showing a configuration of an audio playback system. A BD player 100, an AV amplifier 1, and a display apparatus 200 conform to the HDMI standard, for example, and are connected to each other via HDMI cables. The BD player 100 transmits HDMI data including multichannel audio data and video data to the AV amplifier 1. The AV amplifier 1 amplifies the multichannel audio data included in the HDMI data received from the BD player 100 and outputs the amplified multichannel audio data to speakers. Also, the AV amplifier 1 transmits the HDMI data including video data to the display apparatus 200. The display apparatus 200 displays the video data included in the HDMI data received from the AV amplifier 1.

The AV amplifier 1 has a control unit 2, an HDMI receiving unit 3, an HDMI transmitting unit 4, an audio processing unit 5, an operation unit 6, a display unit 7, and HDMI terminals 8 and 9. To the AV amplifier 1 are connected speakers 300 (corresponding to the speakers in FIG. 1).

The HDMI receiving unit 3 receives HDMI data transmitted from the BD player 100, generates original video data from the received HDMI data, and supplies the video data to the HDMI transmitting unit 4. Also, the HDMI receiving unit 3 generates original multichannel audio data from the received HDMI data and supplies the multichannel audio data to the audio processing unit 5.

The audio processing unit 5 decodes the multichannel audio data supplied from the HDMI receiving unit 3, performs processes including an acoustic process, a D/A conversion process, a volume control process, an amplification process, and the like, on the decoded multichannel audio data, and supplies audio signals of various channels to the speakers 300.

Figure 3:
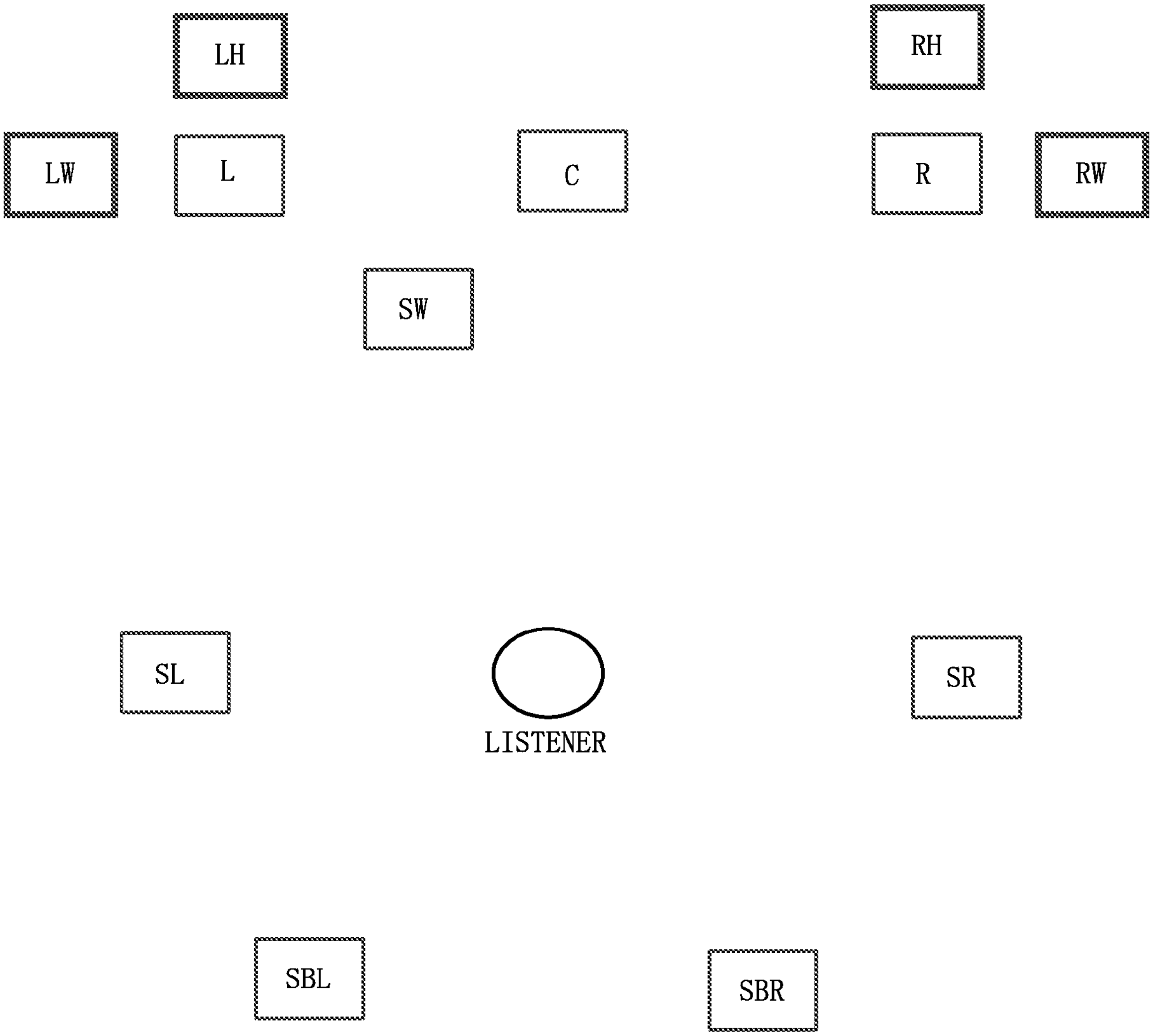
FIG. 3 is a diagram showing channels of audio signals.

Multichannel audio data to be supplied to the audio processing unit 5 will be described. In HD (High Definition) related audio formats such as Dolby True HD, Dolby Digital Plus, and DTS-HD, as shown in FIG. 3, there are, for example, a left audio signal L (front left audio signal), a right audio signal R (front right audio signal), a center audio signal C, a low-frequency audio signal SW, a surround left audio signal SL, a surround right audio signal SR, a surround back left audio signal SBL, a surround back right audio signal SBR, an outer left audio signal LW (first left audio signal), an outer right audio signal RW (first right audio signal), an upper left audio signal LH (second left audio signal), an upper right audio signal RH (second right audio signal), and the like.

The upper left audio signal LH is an audio signal played back from a position on the upper side of the left audio signal L (i.e., the front upper left side of a user). The upper right audio signal RH is an audio signal played back from a position on the upper side of the right audio signal R (i.e., the front upper right side of the user). The outer left audio signal LW is an audio signal played back from a position on the outer side (left side) of the left audio signal L (i.e., the front outer left side of the user). The outer right audio signal RW is an audio signal played back from a position on the outer side (right side) of the right audio signal R (i.e., the front outer right of the user).

Figure 4:
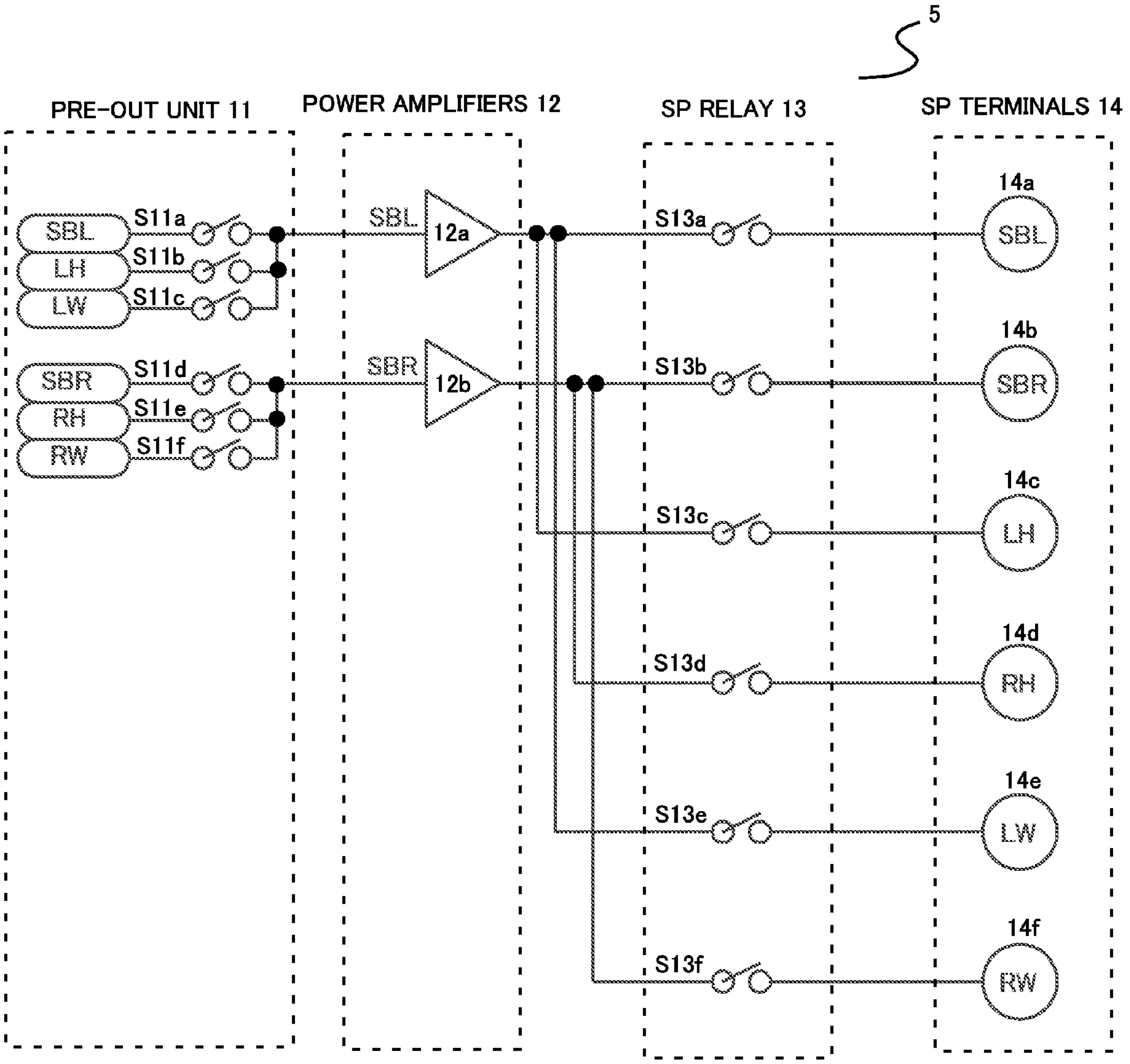
FIG. 4 is a diagram showing an audio processing unit 5.

FIG. 4 is a block diagram showing the main part of the audio processing unit 5. The audio processing unit 5 has a pre-out unit 11, power amplifiers 12, an SP (speaker) relay 13, and SP (speaker) terminals 14. In FIG. 4, circuits for basic 5.1 channels (a left audio signal L, a right audio signal R, a center audio signal C, a low-frequency audio signal SW, a surround left audio signal SL, and a surround right audio signal SR) are the same as those in conventional art and thus are not shown. A DSP and the like provided in a previous stage to the pre-out unit 11 are not shown, either.

The DSP decodes and D/A converts multichannel audio data supplied from the HDMI receiving unit 3 and thereby generates audio signals of various channels. The generated audio signals are supplied to the pre-out unit 11.

The pre-out unit 11 includes switches S11*a* to S11*f*. The switch S11*a* switches whether to output a surround back left audio signal SBL to an amplifier 12*a*. The switch S11*b* switches whether to output an upper left audio signal LH to the amplifier 12*a*. The switch S11*c* switches whether to output an outer left audio signal LW to the amplifier 12*a*. Any one of the switches S11*a* to S11*c* is brought into an on state and any one of the surround back left audio signal SBL, the upper left audio signal LH, and the outer left audio signal LW is supplied to the amplifier 12*a*.

The switch S11*d* switches whether to output a surround back right audio signal SBR to an amplifier 12*b*. The switch S11*e* switches whether to output an upper right audio signal RH to the amplifier 12*b*. The switch S11*f* switches whether to output an outer right audio signal RW to the amplifier 12*b*. Any one of the switches S11*d* to S11*f* is brought into an on state and any one of the surround back right audio signal SBR, the upper right audio signal RH, and the outer right audio signal RW is supplied to the amplifier 12*b*.

The power amplifiers 12 include the amplifiers 12*a* and 12*b*. The amplifier 12*a* amplifies the surround back left audio signal SBL, the upper left audio signal LH, or the outer left audio signal LW inputted thereto and supplies the amplified audio signal to the SP relay 13 (a switch S13*a*, S13*c*, or S13*e*). The amplifier 12*b* amplifies the surround back right audio signal SBR, the upper right audio signal RH, or the outer right audio signal RW inputted thereto and supplies the amplified audio signal to the SP relay 13 (a switch S13*b*, S13*d*, or S13*f*).

The SP relay 13 has the relay switches (hereinafter, referred to as the switches) S13*a* to S13*f*. The switch S13*a* switches whether to supply the surround back left audio signal SBL inputted from the amplifier 12*a*, to a surround back left SP terminal 14*a*. The switch S13*a* is brought into an on state when the switch S11*a* is in an on state. The switch S13*c* switches whether to supply the upper left audio signal LH inputted from the amplifier 12*a*, to an upper left SP terminal 14*c*. The switch S13*c* is brought into an on state when the switch S11*b* is in an on state. The switch S13*e* switches whether to supply the outer left audio signal LW inputted from the amplifier 12*a*, to an outer left SP terminal 14*e*. The switch S13*e* is brought into an on state when the switch S11*c* is in an on state.

The switch S13*b* switches whether to supply the surround back right audio signal SBR inputted from the amplifier 12*b*, to a surround back right SP terminal 14*b*. The switch S13*b* is brought into an on state when the switch S11*d* is in an on state. The switch S13*d* switches whether to supply the outer right audio signal RH inputted from the amplifier 12*b*, to an upper right SP terminal 14*d*. The switch S13*d* is brought into an on state when the switch S11*e* is in an on state. The switch S13*f* switches whether to supply the outer right audio signal RW inputted from the amplifier 12*b*, to an outer right SP terminal 14*f*. The switch S13*f* is brought into an on state when the switch S11*f* is in an on state.

The SP terminals 14 include the SP terminals 14*a* to 14*f*. The surround back left speaker SSBL is connected to the surround back left SP terminal 14*a*, the surround back right speaker SSBR is connected to the surround back right SP terminal 14*b*, the upper left speaker SLH is connected to the upper left SP terminal 14*c*, the upper right speaker SRH is connected to the upper right SP terminal 14*d*, the outer left speaker SLW is connected to the outer left SP terminal 14*e*, and the outer right speaker SRW is connected to the outer right SP terminal 14*f*.

Returning to FIG. 2, the HDMI transmitting unit 4 converts the video data supplied from the HDMI receiving unit 3 to HDMI data and transmits the HDMI data to the display apparatus 200.

The control unit 2 controls each unit based on an operating program of the AV amplifier 1 stored in a memory (not shown) built therein or connected thereto. The control unit 2 is, for example, a microcomputer or CPU.

The control unit 2 performs control to switch between the switches S11*a* to S11*f* and S13*a* to S13*f* (a detail of which will be described later).

The display unit 7 displays images showing the SP terminals 14*a* to 14*f* and the channels and functions of audio signals assigned to the SP terminals 14*a* to 14*f* (a detail of which will be described later).

Figure 5:
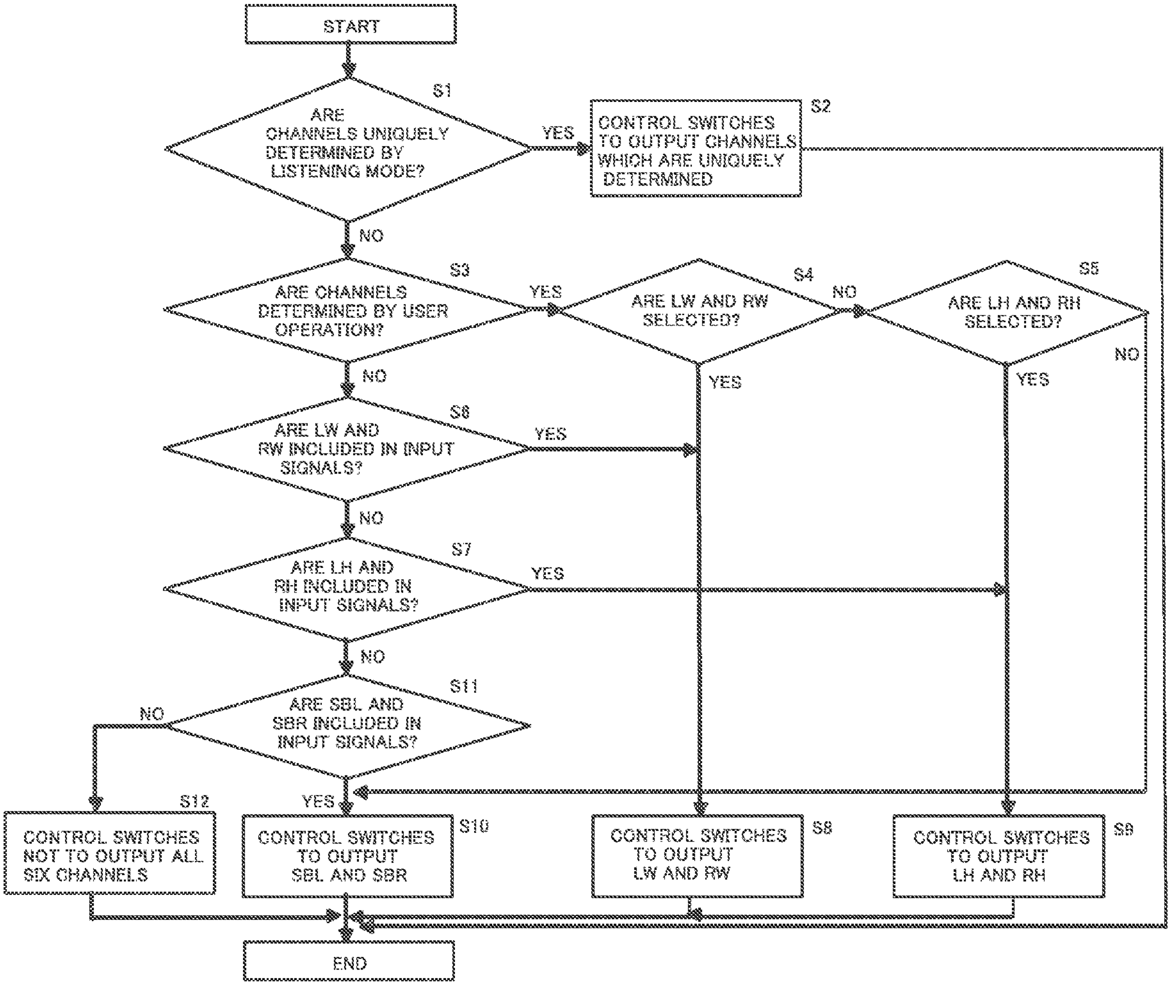
FIG. 5 is a flowchart showing a process performed by a control unit 2.

FIG. 5 is a flowchart showing a process performed by the control unit 2. The HDMI receiving unit 3 generates original multichannel audio data from HDMI data and supplies the multichannel audio data to the audio processing unit 5. The audio processing unit 5 decodes the multichannel audio data, reads channel information included in an information area of the multichannel audio data, and supplies the channel information to the control unit 2.

The control unit 2 determines whether a determination as to whether which one of a combination of the surround back left audio signal SBL and the surround back right audio signal SBR, a combination of the upper left audio signal LH and the upper right audio signal RH, and a combination of the outer left audio signal LW and the outer right audio signal RW is supplied to corresponding SP terminals is uniquely made by a listening mode selected by a user operation (S1). If the determination is uniquely made (YES in S1), then the control unit 2 controls the switches S11*a* to S11*f* and S13*a* to S13*f* to supply a combination to be determined to corresponding SP terminals (S2).

If the determination is not uniquely made (NO in S1), then the control unit 2 determines whether in the listening mode selected by the user operation a channel combination to be supplied to SP terminals is determined by a user operation (S3). If a channel combination is thus determined (YES in S3), then the control unit 2 controls the switches S11*a* to S11*f* and S13*a* to S13*f* to supply a channel combination to be determined to corresponding SP terminals (S4, S5, and S8 to S10).

If a channel combination is not thus determined (NO in S3), then the control unit 2 determines which one of a combination of the surround back left audio signal SBL and the surround back right audio signal SBR, a combination of the upper left audio signal LH and the upper right audio signal RH, and a combination of the outer left audio signal LW and the outer right audio signal RW is included, based on the channel information of input signals included in the multichannel audio data supplied from the audio processing unit 5 (S6, S7, and S11).

If a combination of the outer left audio signal LW and the outer right audio signal RW is included in the multichannel audio data (YES in S6), then the control unit 2 controls the switches to supply the outer left audio signal LW to the outer left SP terminal 14*e* and supply the outer right audio signal RW to the outer right SP terminal 14*f* (S8). Specifically, the control unit 2 controls the switches S11*c*, S11*f*, S13*e*, and S13*f* to be an on state and other switches to be an off state.

If a combination of the upper left audio signal LH and the upper right audio signal RH is included in the multichannel audio data (NO in S6 and YES in S7), then the control unit 2 controls the switches to supply the upper left audio signal LH to the upper left SP terminal 14*c* and supply the upper right audio signal RH to the upper right SP terminal 14*d* (S9). Specifically, the control unit 2 controls the switches S11*b*, S11*e*, S13*c*, and S13*d* to be an on state and other switches to be an off state.

If a combination of the surround back left audio signal SBL and the surround back right audio signal SBR is included in the multichannel audio data (NO in S6, NO in S7, and YES in S11), then the control unit 2 controls the switches to supply the surround back left audio signal SBL to the surround back left SP terminal 14*a* and supply the surround back right audio signal SBR to the surround back right SP terminal 14*b* (S10). Specifically, the control unit 2 controls the switches S11*a*, S11*d*, S13*a*, and S13*b* to be an on state and other switches to be an off state.

If none of a combination of the outer left audio signal LW and the outer right audio signal RW, a combination of the upper left audio signal LH and the upper right audio signal RH, and a combination of the surround back left audio signal SBL and the surround back right audio signal SBR is included in the multichannel audio data (NO in S11), then the control unit 2 controls the switches not to supply audio signals of all these channels to the SP terminals (S12). Specifically, the control unit 2 controls all the switches to be an off state.

As described above, only with the provision of the two amplifiers 12*a* and 12*b*, by determining channel information included in multichannel audio data to be inputted and switching between the switches, any one of a combination of the surround back left audio signal SBL and the surround back right audio signal SBR, a combination of the outer left audio signal LW and the outer right audio signal RW, and a combination of the upper left audio signal LH and the upper right audio signal RH can be amplified and the amplified signals can be supplied to corresponding SP terminals.

Figure 6:
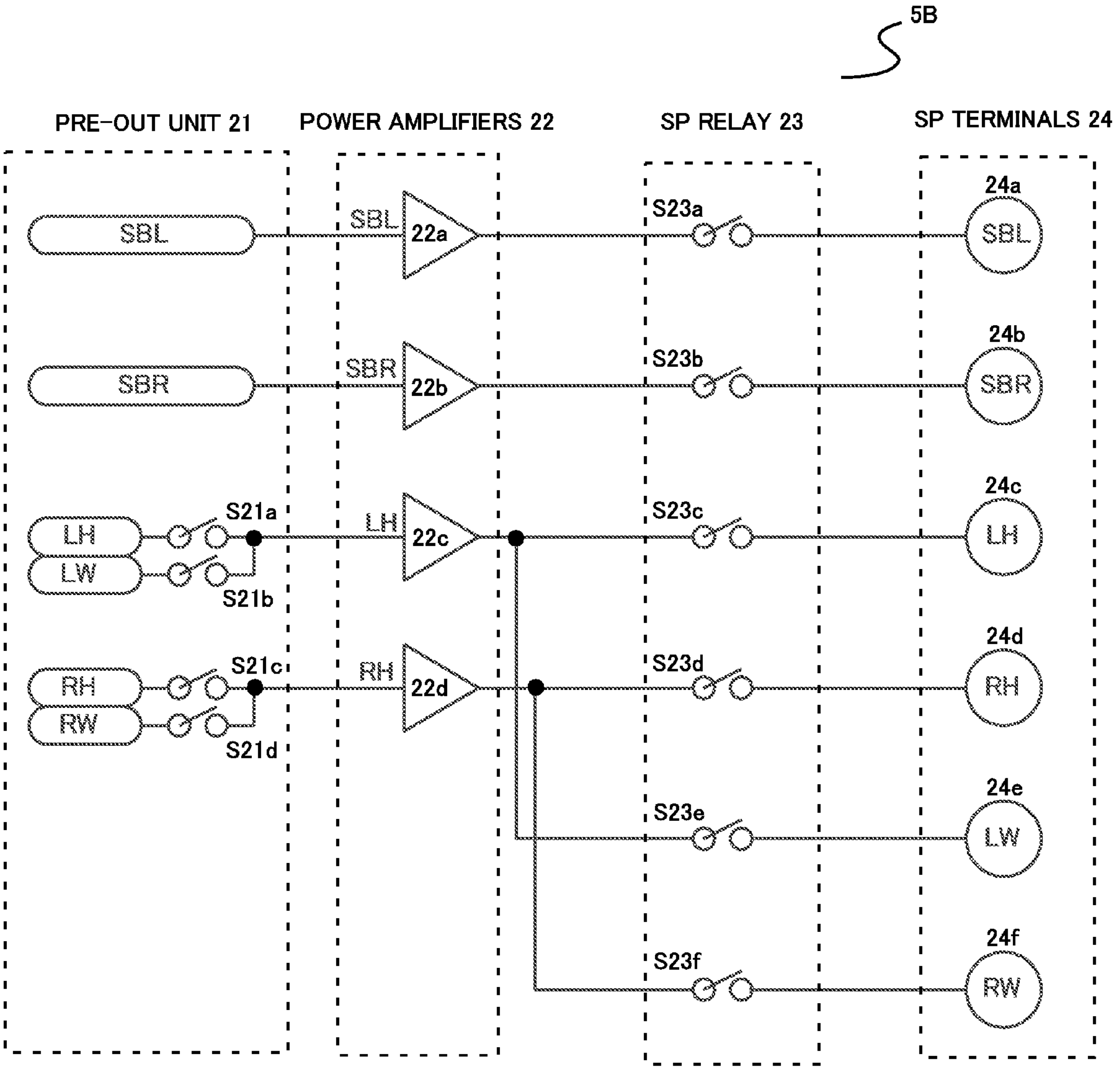
FIG. 6 is a diagram showing an audio processing unit 5B.

Next, an audio processing unit 5B of an AV amplifier according to another preferred embodiment of the present invention will be described with reference to FIG. 6. A pre-out unit 21 includes switches S21*a* to S21*d*. The switch S21*a* switches whether to output an upper left audio signal LH to an amplifier 22*c*. The switch S21*b* switches whether to output an outer left audio signal LW to the amplifier 22*c*. The switch S21*c* switches whether to output an upper right audio signal RH to an amplifier 22*d*. The switch S21*d* switches whether to output an outer right audio signal RW to the amplifier 22*d*.

Power amplifiers 22 include amplifiers 22*a* to 22*d*. The amplifier 22*a* amplifies a surround back left audio signal SBL inputted thereto and supplies the amplified surround back left audio signal SBL to a switch S23*a*. The amplifier 22*b* amplifies a surround back right audio signal SBR inputted thereto and supplies the amplified surround back right audio signal SBR to a switch S23*b*. The amplifier 22*c* amplifies the upper left audio signal LH or the outer left audio signal LW inputted thereto and supplies the amplified audio signal to a switch S23*c* or S23*e*. The amplifier 22*d* amplifies the upper right audio signal RH or the outer right audio signal RW inputted thereto and supplies the amplified audio signal to a switch S23*d* or S23*f*.

An SP relay 23 includes the switches S23*a* to S23*f*. The switch S23*a* switches whether to supply the surround back left audio signal SBL inputted from the amplifier 22*a*, to a surround back left SP terminal 24*a*. The switch S23*c* switches whether to supply the upper left audio signal LH inputted from the amplifier 22*c*, to an upper left SP terminal 24*c*. The switch S23*c* is brought into an on state when the switch S21*a* is in an on state. The switch S23*e* switches whether to supply the outer left audio signal LW inputted from the amplifier 22*c*, to an outer left SP terminal 24*e*. The switch S23*e* is brought into an on state when the switch S21*b* is in an on state.

The switch S23*b* switches whether to supply the surround back right audio signal SBR inputted from the amplifier 22*b*, to a surround back right SP terminal 24*b*. The switch S23*d* switches whether to supply the upper right audio signal RH inputted from the amplifier 22*d*, to an upper right SP terminal 24*d*. The switch S23*d* is brought into an on state when the switch S21*c* is in an on state. The switch S23*f* switches whether to supply the outer right audio signal RW inputted from the amplifier 22*d*, to an outer right SP terminal 24*f*. The switch S23*f* is brought into an on state when the switch S21*d* is in an on state.

Figure 7:
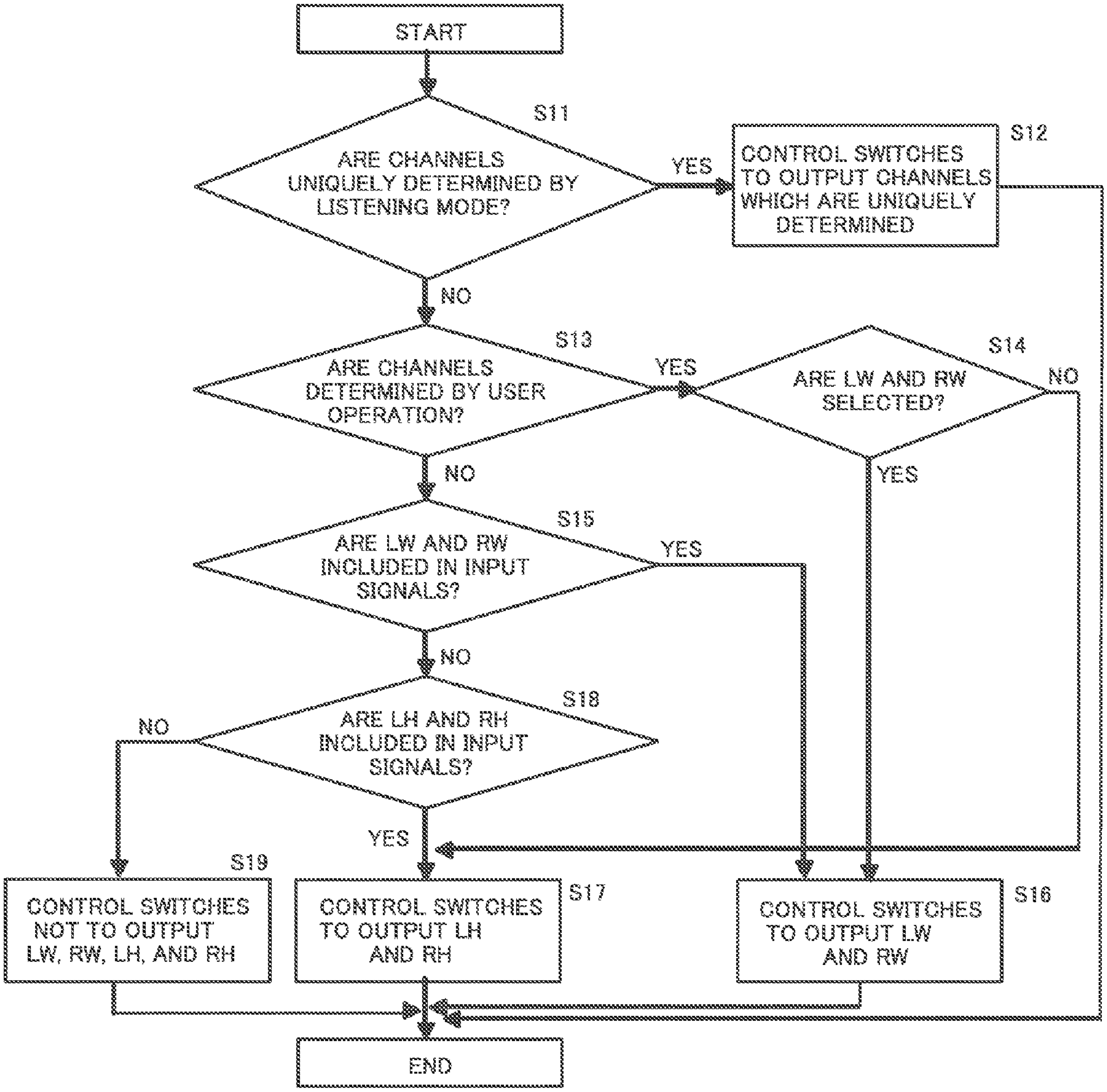
FIG. 7 is a flowchart showing a process performed by the control unit 2.

FIG. 7 is a flowchart showing a process performed by a control unit 2 according to the present example. S11 to S14 are the same as S1 to S5 in FIG. 5 and thus description thereof is omitted.

The control unit 2 determines whether a combination of the outer left audio signal LW and the outer right audio signal RW is included in multichannel audio data (S15). If included (YES in S15), then the control unit 2 controls the switches to supply the outer left audio signal LW to the outer left SP terminal 24*e* and supply the outer right audio signal RW to the outer right SP terminal 24*f* (S16). Specifically, the control unit 2 controls the switches S21*b*, S21*d*, S23*e*, and S23*f* to be an on state and the switches S21*a*, S21*c*, S23*c*, and S23*d* to be an off state.

If determined to be NO in S15, then the control unit 2 determines whether a combination of the upper left audio signal LH and the upper right audio signal RH is included in the multichannel audio data (S18). If included (YES in S18), then the control unit 2 controls the switches to supply the upper left audio signal LH to the upper left SP terminal 24*c* and supply the upper right audio signal RH to the upper right SP terminal 24*d* (S17). Specifically, the control unit 2 controls the switches S21*a*, S21*c*, S23*c*, and S23*d* to be an on state and the switches S21*b*, S21*d*, S23*e*, and S23*f* to be an off state.

If determined to be NO in S18, then the control unit 2 controls the switches not to supply a combination of the outer left audio signal LW and the outer right audio signal RW and a combination of the upper left audio signal LH and the upper right audio signal RH to corresponding SP terminals (S19). Specifically, the control unit 2 controls the switches S21*a* to S21*d* and S23*c* to S23*f* to be an off state.

Figure 8:
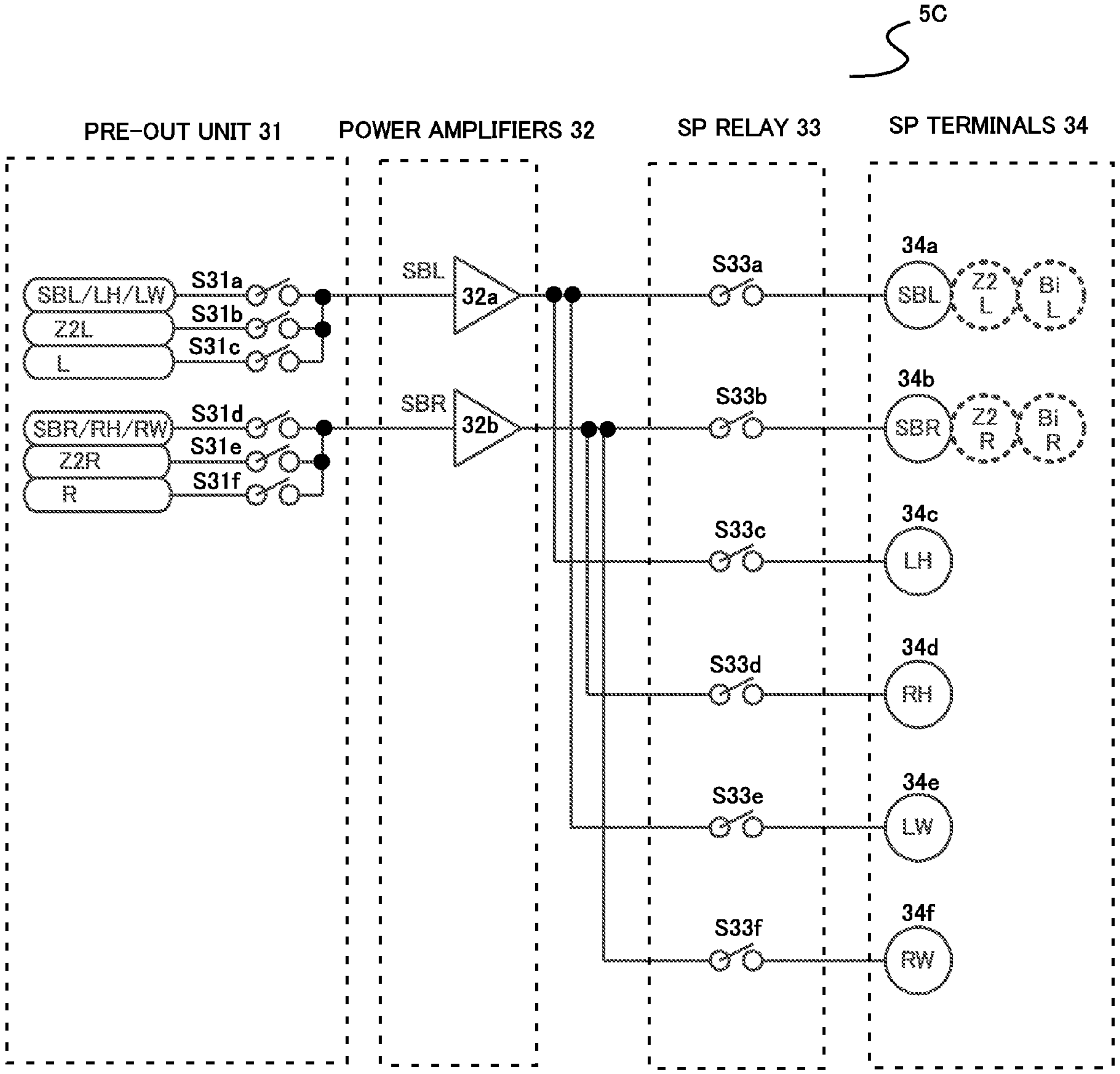
FIG. 8 is a diagram showing an audio processing unit 5C.

Next, an audio processing unit 5C of an AV amplifier according to still another preferred embodiment of the present invention will be described with reference to FIG. 8. The audio processing unit 5C is a variant of the audio processing unit 5 in FIG. 4 and is configured to be able to use Zone2 and Bi-Amp functions.

A pre-out unit 31 includes switches S31*a* to S31*f*. The switch S31*a* switches whether to output any one of a surround back left audio signal SBL, an upper left audio signal LH, and an outer left audio signal LW inputted from a DSP, to an amplifier 32*a*. Specifically, by an instruction from a control unit 2, in the DSP, as a channel to be supplied to the switch S31*a*, any one of the surround back left audio signal SBL, the upper left audio signal LH, and the outer left audio signal LW is selected. The switch S31*b* switches whether to output a Zone2 left audio signal Z2L inputted from the DSP, to the amplifier 32*a*. The switch S31*c* switches whether to output a left audio signal L (for Bi-Amp) inputted from the DSP, to the amplifier 32*a*. Any one of the switches S31*a* to S31*c* is brought into an on state depending on whether to use the Zone2 or Bi-Amp function.

The switch S31*d* switches whether to output any one of a surround back right audio signal SBR, an upper right audio signal RH, and an outer right audio signal RW inputted from the DSP, to an amplifier 32*b*. Specifically, by an instruction from the control unit 2, in the DSP, as a channel to be supplied to the switch S31*d*, any one of the surround back right audio signal SBR, the upper right audio signal RH, and the outer right audio signal RW is selected. The switch S31*e* switches whether to output a Zone2 right audio signal Z2R inputted from the DSP, to the amplifier 32*b*. The switch S31*f* switches whether to output a right audio signal R (for Bi-Amp) inputted from the DSP, to the amplifier 32*b*. Any one of the switches S31*d* to S31*f* is brought into an on state depending on whether to use the Zone2 or Bi-Amp function.

Power amplifiers 32 include the amplifiers 32*a* and 32*b*. The amplifier 32*a* amplifies the surround back left audio signal SBL, the upper left audio signal LH, the outer left audio signal LW, the Zone2 left audio signal Z2L, or the left audio signal L (for Bi-Amp) inputted thereto and supplies the amplified audio signal to a corresponding one of switches S33*a*, S33*c*, and S33*e*. The amplifier 32*b* amplifies the surround back right audio signal SBR, the upper right audio signal RH, the outer right audio signal RW, the Zone2 right audio signal Z2R, or the right audio signal R (for Bi-Amp) inputted thereto and supplies the amplified audio signal to a corresponding one of switches S33*b*, S33*d*, and S33*f*.

An SP relay 33 includes the switches S33*a* to S33*f*. The switch S33*a* switches whether to supply the surround back left audio signal SBL, the Zone2 left audio signal Z2L, or the left audio signal L (for Bi-Amp) inputted from the amplifier 32*a*, to a surround back left SP terminal 34*a*. The switch S33*a* is brought into an on state when the switch S31*a* is in an on state and the surround back left audio signal SBL is supplied to the switch S31*a*, when the switch S31*b* is in an on state, or when the switch S31*c* is in an on state. The switch S33*c* switches whether to supply the upper left audio signal LH inputted from the amplifier 32*a*, to an upper left SP terminal 34*c*. The switch S33*c* is brought into an on state when the switch S31*a* is in an on state and the upper left audio signal LH is supplied to the switch S31*a*. The switch S33*e* switches whether to supply the outer left audio signal LW inputted from the amplifier 32*a*, to an outer left SP terminal 34*e*. The switch S33*e* is brought into an on state when the switch S31*a* is in an on state and the outer left signal LW is supplied to the switch S31*a*.

The switch S33*b* switches whether to supply the surround back right audio signal SBR, the Zone2 right audio signal Z2R, or the right audio signal R (for Bi-Amp) inputted from the amplifier 32*b*, to a surround back right SP terminal 34*b*. The switch S33*b* is brought into an on state when the switch S31*d* is in an on state and the surround back right audio signal SBR is supplied to the switch S31*d*, when the switch S31*e* is in an on state, or when the switch S31*f* is in an on state. The switch S33*d* switches whether to supply the upper right audio signal RH inputted from the amplifier 32*b*, to an upper right SP terminal 34*d*. The switch S33*d* is brought into an on state when the switch S31*d* is in an on state and the upper right audio signal RH is supplied to the switch S31*d*. The switch S33*f* switches whether to supply the outer right audio signal RW inputted from the amplifier 32*b*, to an outer right SP terminal 34*f*. The switch S33*f* is brought into an on state when the switch S31*d* is in an on state and the outer right audio signal RW is supplied to the switch S31*d*.

SP terminals 34 include the SP terminals 34*a* to 34*f*. When the functions are not used, the same speakers as those described above are connected to the SP terminals. When the Zone2 function is used, a Zone2 left speaker SZ2L is connected to the surround back left SP terminal 34*a* and a Zone2 right speaker SZ2R is connected to the surround back right SP terminal 34*b*. When the Bi-Amp function is used, a Bi-Amp terminal of a left speaker SL is connected to the surround back left SP terminal 34*a* and a Bi-Amp terminal of a right speaker SR is connected to the surround back right SP terminal 34*b*.

Next, operations in the present example will be described.

(1) When the Bi-Amp Function is Used

The control unit 2 controls the DSP and the switches to supply the left audio signal L (for Bi-Amp) to the surround back left SP terminal 34*a* and supply the right audio signal R (for Bi-Amp) to the surround back right SP terminal 34*b*. Specifically, the control unit 2 causes the DSP to supply the left audio signal L (for Bi-Amp) to the switch S31*c* and supply the right audio signal R (for Bi-Amp) to the switch S31*f*. The control unit 2 controls the switches S31*c*, S31*f*, S33*a*, and S33*b* to be an on state and other switches to be an off state.

(2) When the Zone2 Function is Used

The control unit 2 controls the DSP and the switches to supply the Zone2 left audio signal Z2L to the surround back left SP terminal 34*a* and supply the Zone2 right audio signal Z2R to the surround back right SP terminal 34*b*. Specifically, the control unit 2 causes the DSP to supply the Zone2 left audio signal Z2L to the switch S31*b* and supply the Zone2 right audio signal Z2R to the switch S31*e*. The control unit 2 controls the switches S31*b*, S31*e*, S33*a*, and S33*b* to be an on state and other switches to be an off state.

(3) When a Combination of the Outer Left Audio Signal LW and the Outer Right Audio Signal RW is Included The control unit 2 controls the DSP and the switches to supply the outer left audio signal LW to the outer left SP terminal 34*e* and supply the outer right audio signal RW to the outer right SP terminal 34*f*. Specifically, the control unit 2 causes the DSP to supply the outer left audio signal LW to the switch S31*a* and supply the outer right audio signal RW to the switch S31*d*. The control unit 2 controls the switches S31*a*, S31*d*, S33*e*, and S33*f* to be an on state and other switches to be an off state.

(4) When a Combination of the Upper Left Audio Signal LH and the Upper Right Audio Signal RH is Included The control unit 2 controls the DSP and the switches to supply the upper left audio signal LH to the upper left SP terminal 34*c* and supply the upper right audio signal RH to the upper right SP terminal 34*d*. Specifically, the control unit 2 causes the DSP to supply the upper left audio signal LH to the switch S31*a* and supply the upper right audio signal RH to the switch S31*d*. The control unit 2 controls the switches S31*a*, S31*d*, S33*c*, and S33*d* to be an on state and other switches to be an off state.

(5) A Combination of the Surround Back Left Audio Signal SBL and the Surround Back Right Audio Signal SBR is Included The control unit 2 controls the DSP and the switches to supply the surround back left audio signal SBL to the surround back left SP terminal 34*a* and supply the surround back right audio signal SBR to the surround back right SP terminal 34*b*. Specifically, the control unit 2 causes the DSP to supply the surround back left audio signal SBL to the switch S31*a* and supply the surround back right audio signal SBR to the switch S31*d*. The control unit 2 controls the switches S31*a*, S31*d*, S33*a*, and S33*b* to be an on state and other switches to be an off state.

Figure 9:
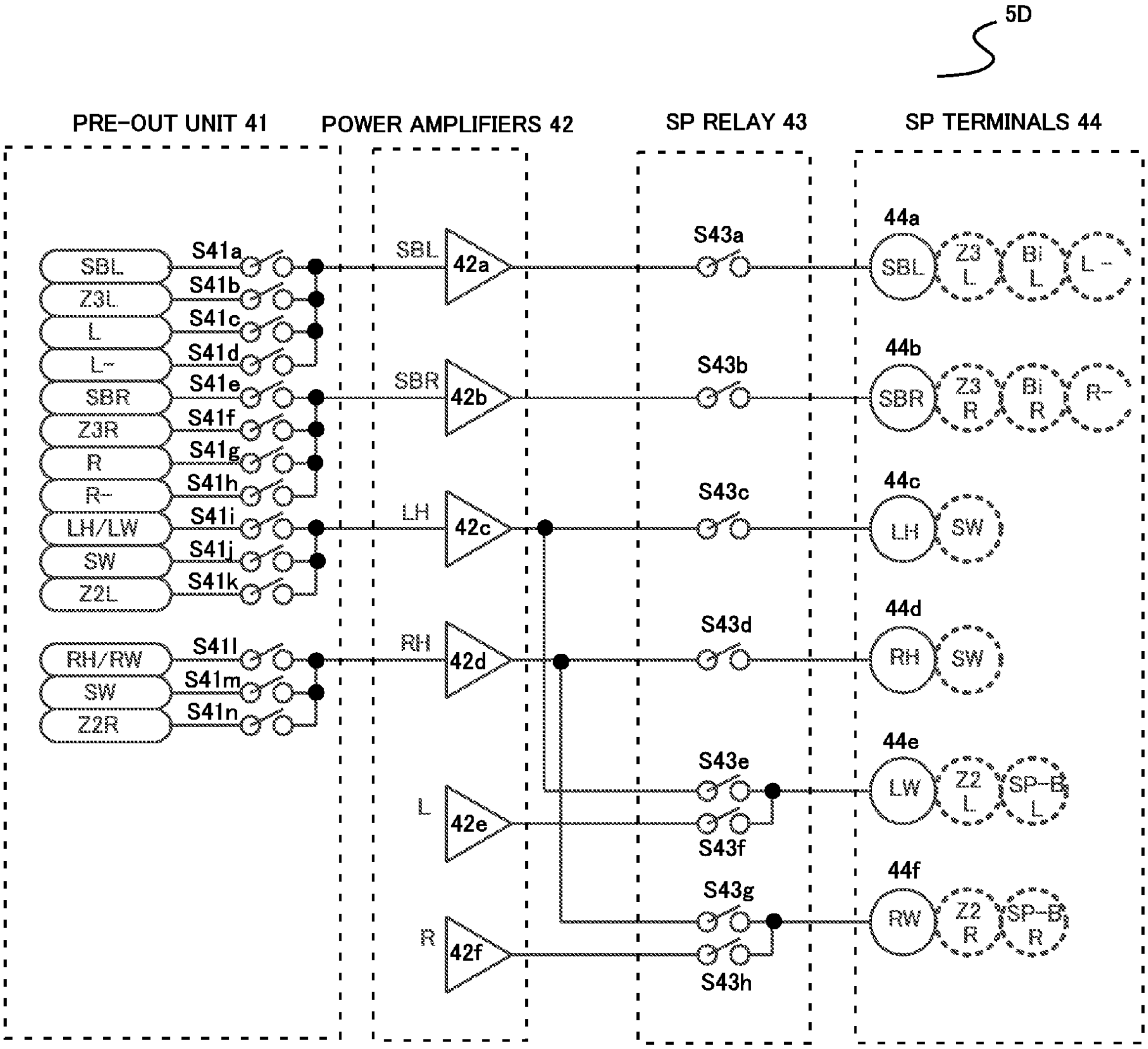
FIG. 9 is a diagram showing an audio processing unit 5D.

Next, an audio processing unit 5D of an AV amplifier according to yet another preferred embodiment of the present invention will be described with reference to FIG. 9. The audio processing unit 5D is a variant of the audio processing unit 5B in FIG. 6 and is configured to allow Zone2, Zone3, Bi-Amp, BTL, speaker B, and passive sub-woofer output functions to be applicable thereto.

A pre-out unit 41 includes switches S41*a* to S41*n*. The switch S41*a* switches whether to output a surround back left audio signal SBL inputted from a DSP, to an amplifier 42*a*. The switch S41*b* switches whether to output a Zone3 left audio signal Z3L inputted from the DSP, to the amplifier 42*a*. The switch S41*c* switches whether to output a left audio signal L (for Bi-Amp) inputted from the DSP, to the amplifier 42*a*. The switch S41*d* switches whether to output a BTL left audio signal L− to the amplifier 42a. Any one of the switches S41a to S41d is brought into an on state depending on whether to use the functions.

The switch S41e switches whether to output a surround back right audio signal SBR inputted from the DSP, to an amplifier 42b. The switch S41f switches whether to output a Zone3 right audio signal Z3R inputted from the DSP, to the amplifier 42b. The switch S41g switches whether to output a right audio signal R (for Bi-Amp) inputted from the DSP, to the amplifier 42b. The switch S41h switches whether to output a BTL right audio signal R− to the amplifier 42b. Any one of the switches S41e to S41h is brought into an on state depending on whether to use the functions.

The switch S41i switches whether to output an upper left audio signal LH or an outer left audio signal LW inputted from the DSP, to an amplifier 42c. Specifically, in the DSP, as a channel to be supplied to the switch S41i, one of the upper left audio signal LH and the outer left audio signal LW is selected. The switch S41j switches whether to output a low-frequency audio signal SW inputted from the DSP, to the amplifier 42c. The switch S41k switches whether to output a Zone2 left audio signal Z2L inputted from the DSP, to the amplifier 42c. Any one of the switches S41i to S41k is brought into an on state depending on whether to use the functions.

The switch S41l switches whether to output an upper right audio signal RH or an outer right audio signal RW inputted from the DSP, to an amplifier 42d. Specifically, in the DSP, as a channel to be supplied to the S41l, one of the upper right audio signal RH and the outer right audio signal RW is selected. The switch S41m switches whether to output a low-frequency audio signal SW inputted from the DSP, to the amplifier 42d. The switch S41n switches whether to output a Zone2 right audio signal Z2R inputted from the DSP, to the amplifier 42d. Any one of the switches S41l to 41n is brought into an on state depending on whether to use the functions.

Power amplifiers 42 include the amplifiers 42a to 42d. The amplifier 42a amplifies the surround back left audio signal SBL, the Zone3 left audio signal Z3L, the left audio signal L (for Bi-Amp), or the BTL left audio signal L− inputted thereto and supplies the amplified audio signal to a switch S43a. The amplifier 42b amplifies the surround back right audio signal SBR, the Zone3 right audio signal Z3R, the right audio signal R (for Bi-Amp), or the BTL right audio signal R− inputted thereto and supplies the amplified audio signal to a switch S43b. The amplifier 42c amplifies the upper left audio signal LH, the outer left audio signal LW, the low-frequency audio signal SW, or the Zone2 left audio signal Z2L inputted thereto and supplies the amplified audio signal to a switch S43c. The amplifier 42d amplifies the upper right audio signal RH, the outer right audio signal RW, the low-frequency audio signal SW, or the Zone2 right audio signal Z2R inputted thereto and supplies the amplified audio signal to a switch S43d. An amplifier 42e is an amplifier for a left audio signal L, amplifies the left audio signal L supplied from the DSP, and supplies the amplified left audio signal L to a switch S43f. An amplifier 42f is an amplifier for a right audio signal R, amplifies the right audio signal R supplied from the DSP, and supplies the amplified right audio signal R to a switch S43h.

An SP relay 43 includes the switches S43a to S43h. The switch S43a switches whether to supply the surround back left audio signal SBL, the Zone3 left audio signal Z3L, the left audio signal L (for Bi-Amp), or the BTL left audio signal L− inputted from the amplifier 42a, to a surround back left SP terminal 44a. The switch S43a goes to an on state when any one of the switches S41a to S41d is in an on state. The switch S43b switches whether to supply the surround back right audio signal SBR, the Zone3 right audio signal Z3R, the right audio signal R (for Bi-Amp), or the BTL right audio signal R− inputted from the amplifier 42b, to a surround back right SP terminal 44b. The switch S43b goes to an on state when any one of the switches S41e to S41h is in an on state.

The switch S43c switches whether to supply the upper left audio signal LH or the low-frequency audio signal SW inputted from the amplifier 42c, to an upper left SP terminal 44c. The switch S43c is brought into an on state when the switch S41i is in an on state and the upper left audio signal LH is supplied to the switch S41i or when the switch S41j is in an on state. The switch S43d switches whether to supply the upper right audio signal RH or the low-frequency audio signal SW inputted from the amplifier 42d, to an upper right SP terminal 44d. The switch S43d is brought into an on state when the switch S41l is in an on state and the upper right audio signal RH is supplied to the switch S41l or when the switch S41m is in an on state.

A switch S43e switches whether to supply the outer left audio signal LW or the Zone2 left audio signal Z2L inputted from the amplifier 42c, to an outer left SP terminal 44e. The switch S43e is brought into an on state when the switch S41i is in an on state and the outer left audio signal LW is supplied to the switch S41i or when the switch S41k is in an on state. A switch S43g switches whether to supply the outer right audio signal RW or the Zone2 right audio signal Z2R inputted from the amplifier 42d, to an outer right SP terminal 44f. The switch S43g is brought into an on state when the switch S41l is in an on state and the outer right audio signal RW is supplied to the switch S41l or when the switch S41n is in an on state.

The switch S43f switches whether to supply the left audio signal L (for speaker B) inputted from the amplifier 42e, to the outer left SP terminal 44e. The switch S43h switches whether to supply the right audio signal R (for speaker B) inputted from the amplifier 42f, to the outer right SP terminal 44f.

SP terminals 44 include the SP terminals 44a to 44f. When the functions are not used, the same speakers as those described above are connected to the SP terminals. When the Zone3 function is used, a Zone3 left speaker SZ3L is connected to the surround back left SP terminal 44a and a Zone3 right speaker SZ3R is connected to the surround back right SP terminal 44b. When the Bi-Amp function is used, a Bi-Amp terminal of a left speaker SL is connected to the surround back left SP terminal 44a and a Bi-Amp terminal of a right speaker SR is connected to the surround back right SP terminal 44b. When the BTL function is used, a − side of the left speaker SL is connected to the surround back left SP terminal 44a and a − side of the right speaker SR is connected to the surround back right SP terminal 44b. When the passive sub-woofer output function is used, a passive sub-woofer (a speaker dedicated to low frequencies, which is not built in the amplifier) is connected to the upper left SP terminal 44c and the upper right SP terminal 44d. When the Zone2 function is used, a Zone2 left speaker SZ2L is connected to the outer left SP terminal 44e and a Zone2 right speaker SZ2R is connected to the outer right SP terminal 44f. When the speaker B function is used, a speaker B left speaker SLB is connected to the outer left SP terminal 44e and a speaker B right speaker SRB is connected to the outer right SP terminal 44f.

Next, operations in the present example will be described.

(1) When the Bi-Amp Function is Used

A control unit 2 controls the DSP and the switches to supply the left audio signal L (for Bi-Amp) to the surround back left SP terminal 44a and supply the right audio signal R (for Bi-Amp) to the surround back right SP terminal 44b. Specifically, the control unit 2 causes the DSP to supply the left audio signal L (for Bi-Amp) to the switch S41c and supply the right audio signal R (for Bi-Amp) to the switch S41*g*. The control unit 2 controls the switches S41*c*, S41*g*, S43*a*, and S43*b* to be an on state and the switches S41*a*, S41*b*, S41*d*, S41*e*, S41*f*, and S41*h* to be an off state.

(2) When the BTL Function is Used The control unit 2 controls the DSP and the switches to supply the BTL left audio signal L− to the surround back left SP terminal 44*a* and supply the BTL right audio signal R− to the surround back right SP terminal 44*b*. Specifically, the control unit 2 causes the DSP to supply the BTL left audio signal L− to the switch S41*d* and supply the BTL right audio signal R− to the switch S41*h*. The control unit 2 controls the switches S41*d*, S41*h*, S43*a*, and S43*b* to be an on state and the switches S41*a*, S41*b*, S41*c*, S41*e*, S41*f*, and S41*g* to be an off state.

(3) When the Speaker B Function is Used

The control unit 2 controls the DSP and the switches to supply the left audio signal L to the outer left SP terminal 44*e* and supply the right audio signal R to the outer right SP terminal 44*f*. Specifically, the control unit 2 controls the switches S43*f* and S43*h* to be an on state and the switches S41*i* to S41*n*, S43*c*, S43*d*, S43*e*, and S43*g* to be an off state.

(4) When the Passive Sub-Woofer Output Function is Used

The control unit 2 controls the DSP and the switches to supply the low-frequency audio signal SW to the upper left SP terminal 44*c* and the upper right SP terminal 44*d*. Specifically, the control unit 2 causes the DSP to supply the low-frequency audio signal SW to the switches S41*j* and S41*m*. The control unit 2 controls the switches S41*j*, S41*m*, S43*c*, and S43*d* to be an on state and the switches S41*i*, S41*k*, S41*l*, S41*n*, S43*e*, S43*f*, S43*g*, and S43*h* to be an off state.

(5) When the Zone2 Function is Used

The control unit 2 controls the DSP and the switches to supply the Zone2 left audio signal Z2L to the outer left SP terminal 44*e* and supply the Zone2 right audio signal Z2R to the outer right SP terminal 44*f*. Specifically, the control unit 2 causes the DSP to supply the Zone2 left audio signal Z2L to the switch S41*k* and supply the Zone2 right audio signal Z2R to the switch S41*n*. The control unit 2 controls the switches S41*k*, S41*n*, S43*e*, and S43*g* to be an on state and the switches S41*i*, S41*j*, S41*l*, S41*m*, S43*c*, S43*d*, S43*f*, and S43*g* to be an off state.

(6) When the Zone3 Function is Used

The control unit 2 controls the DSP and the switches to supply the Zone3 left audio signal Z3L to the surround back left SP terminal 44*a* and supply the Zone3 right audio signal Z3R to the surround back right SP terminal 44*b*. Specifically, the control unit 2 causes the DSP to supply the Zone3 left audio signal Z3L to the switch S41*b* and supply the Zone3 right audio signal Z3R to the switch S41*f*. The control unit 2 controls the switches S41*b*, S41*f*, S43*a*, and S43*b* to be an on state and the switches S41*a*, S41*c*, S41*d*, S41*e*, S41*g*, and S41*h* to be an off state.

(7) When a Combination of the Outer Left Audio Signal LW and the Outer Right Audio Signal RW is Included The control unit 2 controls the DSP and the switches to supply the outer left audio signal LW to the outer left SP terminal 44*e* and supply the outer right audio signal RW to the outer right SP terminal 44*f*. Specifically, the control unit 2 causes the DSP to supply the outer left audio signal LW to the switch S41*i* and supply the outer right audio signal RW to the switch S41*l*. The control unit 2 controls the switches S41*i*, S41*l*, S43*e*, and S43*g* to be an on state and the switches S41*j*, S41*k*, S41*m*, S41*n*, S43*c*, S43*d*, S43*f*, and S43*h* to be an off state.

(8) When a Combination of the Upper Left Audio Signal LH and the Upper Right Audio Signal RH is Included The control unit 2 controls the DSP and the switches to supply the upper left audio signal LH to the upper left SP terminal 44*c* and supply the upper right audio signal RH to the upper right SP terminal 44*d*. Specifically, the control unit 2 causes the DSP to supply the upper left audio signal LH to the switch S41*i* and supply the upper right audio signal RH to the switch S41*l*. The control unit 2 controls the switches S41*i*, S41*l*, S43*c*, and S43*d* to be an on state and the switches S41*j*, S41*k*, S41*m*, S41*n*, S43*e*, S43*f*, S43*g*, and S43*h* to be an off state.

(9) When a Combination of the Surround Back Left Audio Signal SBL and the Surround Back Right Audio Signal SBR is Included The control unit 2 controls the DSP and the switches to supply the surround back left audio signal SBL to the surround back left SP terminal 44*a* and supply the surround back right audio signal SBR to the surround back right SP terminal 44*b*. Specifically, the control unit 2 causes the DSP to supply the surround back left audio signal SBL to the switch S41*a* and supply the surround back right audio signal SBR to the switch S41*e*. The control unit 2 controls the switches S41*a*, S41*e*, S43*a*, and S43*b* to be an on state and the switches S41*b*, S41*c*, S41*d*, S41*f*, S41*g*, and S41*h* to be an off state.

Although the preferred embodiments of the present invention are described above, the present invention is not limited thereto. Instead of an upper left audio signal and an upper right audio signal, a center left audio signal (a signal between a left audio signal and a center audio signal) and a center right audio signal (a signal between a right audio signal and the center audio signal) may be applied. The present invention may also be provided in the form of a program that causes a computer to perform the above-described operations of an AV amplifier, and a recording medium recording the program.

What is claimed is:

1. An audio processing apparatus comprising:

first amplification section for amplifying an outer left audio signal or an upper left audio signal;

second amplification section for amplifying an outer right audio signal or an upper right audio signal;

a first speaker terminal that outputs the outer left audio signal;

a second speaker terminal that outputs the outer right audio signal;

a third speaker terminal that outputs the upper left audio signal;

a fourth speaker terminal that outputs the upper right audio signal;

channel determination section for determining which one of a combination of the outer left audio signal and the outer right audio signal and a combination of the upper left audio signal and the upper right audio signal is included in multichannel audio data; and switching section for causing the first amplification section to amplify the outer left audio signal and supply the amplified outer left audio signal to the first speaker terminal and causing the second amplification section to amplify the outer right audio signal and supply the amplified outer right audio signal to the second speaker terminal when the combination of the outer left audio signal and the outer right audio signal is determined to be included; and causing the first amplification section to amplify the upper left audio signal and supply the amplified upper left audio signal to the third speaker terminal and causing the second amplification section to amplify the upper right audio signal and supply the amplified upper right audio signal to the fourth speaker terminal when the combination of the upper left audio signal and the upper right audio signal is determined to be included.

2. The audio processing apparatus according to claim 1 further comprising:

a fifth speaker terminal that outputs a surround back left audio signal; and a sixth speaker terminal that outputs a surround back right audio signal, wherein the channel determination section determines which one of a combination of the outer left audio signal and the outer right audio signal, a combination of the upper left audio signal and the upper right audio signal, and a combination of the surround back left audio signal and the surround back right audio signal is included in multichannel audio data, and when the combination of the outer left audio signal and the outer right audio signal is determined to be included, the switching section causes the first amplification section to amplify the outer left audio signal and supply the amplified outer left audio signal to the first speaker terminal and causes the second amplification section to amplify the outer right audio signal and supply the amplified outer right audio signal to the second speaker terminal; when the combination of the upper left audio signal and the upper right audio signal is determined to be included, the switching section causes the first amplification section to amplify the upper left audio signal and supply the amplified upper left audio signal to the third speaker terminal and causes the second amplification section to amplify the upper right audio signal and supply the amplified upper right audio signal to the fourth speaker terminal; and when the combination of the surround back left audio signal and the surround back right audio signal is determined to be included, the switching section causes the first amplification section to amplify the surround back left audio signal and supply the amplified surround back left audio signal to the fifth speaker terminal and causes the second amplification section to amplify the surround back right audio signal and supply the amplified surround back right audio signal to the sixth speaker terminal.

3. An audio processing apparatus comprising:

first amplification section for amplifying a first left audio signal that is one of an outer left audio signal, an upper left audio signal, a surround back left audio signal and a center left audio signal or a second left audio signal that is one of an outer left audio signal, an upper left audio signal, a surround back left audio signal and a center left audio signal and that is different from the first left audio signal;

second amplification section for amplifying a first right audio signal that is one of an outer right audio signal, an upper right audio signal, a surround back right audio signal and a center right audio signal or a second right audio signal that is one of an outer right audio signal, an upper right audio signal, a surround back right audio signal and a center right audio signal and that is different from the first right audio signal;

a first speaker terminal that outputs the first left audio signal;

a second speaker terminal that outputs the first right audio signal;

a third speaker terminal that outputs the second left audio signal;

a fourth speaker terminal that outputs the second right audio signal;

channel determination section for determining which one of a combination of the first left audio signal and the first right audio signal and a combination of the second left audio signal and the second right audio signal is included in multichannel audio data; and switching section for causing the first amplification section to amplify the first left audio signal and supply the amplified first left audio signal to the first speaker terminal and causing the second amplification section to amplify the first right audio signal and supply the amplified first right audio signal to the second speaker terminal when the combination of the first left audio signal and the first right audio signal is determined to be included; and causing the first amplification section to amplify the second left audio signal and supply the amplified second left audio signal to the third speaker terminal and causing the second amplification section to amplify the second right audio signal and supply the amplified second right audio signal to the fourth speaker terminal when the combination of the second left audio signal and the second right audio signal is determined to be included.

4. An audio processing apparatus comprising:

first amplification section for amplifying an outer left audio signal or a surround back left audio signal;

second amplification section for amplifying an outer right audio signal or a surround back right audio signal;

a first speaker terminal that outputs the outer left audio signal;

a second speaker terminal that outputs the outer right audio signal;

a third speaker terminal that outputs the surround back left audio signal;

a fourth speaker terminal that outputs the surround back right audio signal;

channel determination section for determining which one of a combination of the outer left audio signal and the outer right audio signal and a combination of the surround back left audio signal and the surround back right audio signal is included in multichannel audio data; and switching section for causing the first amplification section to amplify the outer left audio signal and supply the amplified outer left audio signal to the first speaker terminal and causing the second amplification section to amplify the outer right audio signal and supply the amplified outer right audio signal to the second speaker terminal when the combination of the outer left audio signal and the outer right audio signal is determined to be included; and causing the first amplification section to amplify the surround back left audio signal and supply the amplified surround back left audio signal to the third speaker terminal and causing the second amplification section to amplify the surround back right audio signal and supply the amplified surround back right audio signal to the fourth speaker terminal when the combination of the surround back left audio signal and the surround back right audio signal is determined to be included.

5. An audio processing apparatus comprising:

first amplification section for amplifying a surround back left audio signal or an upper left audio signal;

second amplification section for amplifying a surround back right audio signal or an upper right audio signal;

a first speaker terminal that outputs the surround back left audio signal;

a second speaker terminal that outputs the surround back right audio signal;

a third speaker terminal that outputs the upper left audio signal;

a fourth speaker terminal that outputs the upper right audio signal;

channel determination section for determining which one of a combination of the surround back left audio signal and the surround back right audio signal and a combination of the upper left audio signal and the upper right audio signal is included in multichannel audio data; and switching section for causing the first amplification section to amplify the surround back left audio signal and supply the amplified surround back left audio signal to the first speaker terminal and causing the second amplification section to amplify the surround back right audio signal and supply the amplified surround back right audio signal to the second speaker terminal when the combination of the surround back left audio signal and the surround back right audio signal is determined to be included; and causing the first amplification section to amplify the upper left audio signal and supply the amplified upper left audio signal to the third speaker terminal and causing the second amplification section to amplify the upper right audio signal and supply the amplified upper right audio signal to the fourth speaker terminal when the combination of the upper left audio signal and the upper right audio signal is determined to be included.

6. An audio processing apparatus comprising:

first amplification section for amplifying an outer left audio signal or a center left audio signal;

second amplification section for amplifying an outer right audio signal or a center right audio signal;

a first speaker terminal that outputs the outer left audio signal;

a second speaker terminal that outputs the outer right audio signal;

a third speaker terminal that outputs the center left audio signal;

a fourth speaker terminal that outputs the center right audio signal;

channel determination section for determining which one of a combination of the outer left audio signal and the outer right audio signal and a combination of the center left audio signal and the center right audio signal is included in multichannel audio data; and switching section for causing the first amplification section to amplify the outer left audio signal and supply the amplified outer left audio signal to the first speaker terminal and causing the second amplification section to amplify the outer right audio signal and supply the amplified outer right audio signal to the second speaker terminal when the combination of the outer left audio signal and the outer right audio signal is determined to be included; and causing the first amplification section to amplify the center left audio signal and supply the amplified center left audio signal to the third speaker terminal and causing the second amplification section to amplify the center right audio signal and supply the amplified center right audio signal to the fourth speaker terminal when the combination of the center left audio signal and the center right audio signal is determined to be included.

* * * * *